United States Patent
Zhu et al.

(10) Patent No.: US 7,176,982 B2
(45) Date of Patent: Feb. 13, 2007

(54) RECURSIVE NOISE REDUCTION WITH STILL PIXEL DETECTION

(75) Inventors: Ge Zhu, Shanghai (CN); Edward Chen, Shanghai (CN); Henry Haojan Tung, San Jose, CA (US)

(73) Assignee: Huaya Microelectronics, Ltd., San Jose, CA (US)

( * ) Notice: Subject to any disclaimer, the term of this patent is extended or adjusted under 35 U.S.C. 154(b) by 530 days.

(21) Appl. No.: 10/659,032

(22) Filed: Sep. 9, 2003

(65) Prior Publication Data

US 2004/0233334 A1 Nov. 25, 2004

(51) Int. Cl.
*H04N 5/00* (2006.01)

(52) U.S. Cl. ...................... 348/620; 348/619
(58) Field of Classification Search .............. 348/607, 348/618, 619, 620, 621, 622, 627; 382/625
See application file for complete search history.

(56) References Cited

U.S. PATENT DOCUMENTS

| 4,390,894 | A | * | 6/1983 | Raven | 348/620 |
| 4,626,891 | A | * | 12/1986 | Achiha | 348/702 |
| 4,881,125 | A | * | 11/1989 | Krause | 348/448 |
| 5,027,201 | A | * | 6/1991 | Bernard | 348/702 |
| 6,411,341 | B1 | * | 6/2002 | De Haan et al. | 348/714 |

* cited by examiner

*Primary Examiner*—Michael H. Lee
(74) *Attorney, Agent, or Firm*—Silicon Valley Patent Group; Edward S. Mao

(57) ABSTRACT

A system and system for performing adaptive recursive noise reduction with still pixel detection on a video stream is presented. After processing a field pixels that were modified are stored in the field so that processing of later fields uses the modified pixels. Furthermore, the system uses novel still pixel detection routines that include multiple thresholds and multiple windows of pixels so that noise reduction is only performed on still pixels.

27 Claims, 5 Drawing Sheets

RECURSIVE NOISE REDUCTION WITH STILL PIXEL DETECTION

BACKGROUND OF THE INVENTION

1. Field of the Invention

The present invention relates to digital image and video processing. More specifically, the present invention relates to methods of noise reduction for interlaced digital video stream.

2. Discussion of Related Art

Due to advancing semiconductor processing technology, integrated circuits (ICs) have greatly increased in functionality and complexity. With increasing processing and memory capabilities, many formerly analog tasks are being performed digitally. For example, images, audio and even full motion video can now be produced, distributed, and used in digital formats.

FIG. 1 is an illustrative diagram of a portion of interlaced digital video stream 100 most often used in television systems. Interlaced digital video stream 100 comprises a series of individual fields 100_1 to 100_N, of which the first ten fields are shown. Even fields contain even numbered rows while odd fields contain odd numbered rows. For example if a frame has 400 rows of 640 pixels, the even field would contains rows 2, 4, ... 400 and the odd field would contains rows 1, 3, 5, ... 399 of the frame. In general for an interlaced video stream each field is formed at a different time. For example, an interlaced video capture device (e.g. a video camera) captures and stores the odd scan lines of a scene at time T as field 100_1, then the video capture device stores the even scan lines of a scene at time T+1 as field 100_2. The process continues for each field.

FIG. 2 illustrates a conventional noise reduction system 200 having a digital buffer 210, a noise reduction unit 220, and a deinterlacer 230. Digital buffer 210 stores portions of an input interlaced video stream I_IVS. Typically, digital buffer 210 is configured to store an integer number of fields from input interlaced video stream I_IVS. In general, video streams are stored in YUV format, where Y is the luminance, and U and V are chrominance values. Noise reduction unit 220 reads image data from digital buffer 210 as appropriate for the noise reduction algorithm and generates an interlaced noise reduced digital video stream INRDVS which is provided to deinterlacer 230. Deinterlacer 230 processes corresponding fields to generate progressive video frames and output deinterlaced video stream O_DVS, which can be displayed on a progressive digital video device (not shown).

Although digital images generally provide higher noise immunity, most digital images in digital video streams are converted from analog video streams. The original analog video stream may contain noise from various sources. For example, modulation, wireless transmission and demodulation of TV signals may introduce Gaussian-like noise. Furthermore, even analog video transferred over transmission lines may have Gaussian-like noise due to magnetic fields around the transmission lines. In addition, the digitalizing process may inadvertently amplify minor noise problems in the analog video stream.

Hence, there is a need for a noise filtering method or system to reduce noise in a digital image. Furthermore, noise filtering in a digital video stream must be performed quickly to match the frame rate of the digital video stream.

SUMMARY

Accordingly, the present invention provides a method and system for determining whether pixels as still pixels and then performing noise reduction on the still pixels. To provide recursive noise reduction, some embodiments of the present invention the noise reduction writes data back into the digital buffer to perform recursive noise reduction. For example, a first field having a plurality of pixels is stored in a first field buffer. A second field is stored in a second field buffer. A subset of pixels from the second field are modified using information from the first field. The subset of pixels are stored in the second buffer. A third field is stored in the first field buffer. Then, a subset of pixels in the third field is modified using information from the second field. The subset of modified pixels is stored into the first buffer so that processing of a later fourth frame can use the modified pixels.

In some embodiments of the present invention, separate noise reduction is performed on the luminance and chrominance values of the pixels. For example processing a current pixel includes determining whether the current pixel is a luminance still pixel. If the current pixel is a luminance still pixel, the luminance value of the current pixel is modified to reduce noise. Furthermore, if the current pixel is a luminance still pixel, the current pixel is tested to determine whether the current pixel is a chrominance still pixel. If the current pixel is a chrominance still pixel, the chrominance values of the current pixel are modified to reduce noise.

The present invention also incorporates novel still pixel detection methods. In some embodiments of the present invention, determining whether a current pixel is a still pixel involves two windows defined around the current pixel. Specifically, a first window is defined to include the current pixel and other pixels. Generally the current first window includes the current pixel and a few pixels to the right of the current pixel. A second window is also defined. Generally, the second window includes the current pixel and a few pixels to the left of the current pixel. A first window still pixel test using the pixels in the first window and a second window still pixel test using the pixels in the second window are performed. If the current pixel passes either the first window still pixel test or the second window still pixel test, the current pixel is determined to be a still pixel.

Some embodiments of the present invention use a multi-threshold test to determine whether a pixel in a defined window is a still pixel. Specifically, pixel pair differences are calculated for each pixel in the first window with a corresponding pixel in another field. If the absolute value of any pixel pair difference is greater than a difference threshold, the current pixel is determined to not be a still pixel. If the absolute values of the pixel pair differences are all less than the difference threshold, a correlation sum is generated by adding the absolute values of each pixel pair difference that is greater than a summation threshold. If the correlation sum divided by the size of the first window is less than or equal to a correlation threshold the current pixel is determined to be a still pixel. For embodiments of the present invention that use two windows the multi-threshold test can be used in both windows.

The present invention will be more fully understood in view of the following description and drawings.

DETAILED DESCRIPTION

Because human vision is especially sensitive to high frequency noise in low frequency areas of a video stream, the present invention concentrates on reducing noise on still parts of the video stream. Thus, the present invention detects still pixels within the input interlaced video stream and provides noise reduction for the still pixels.

Figure 1:
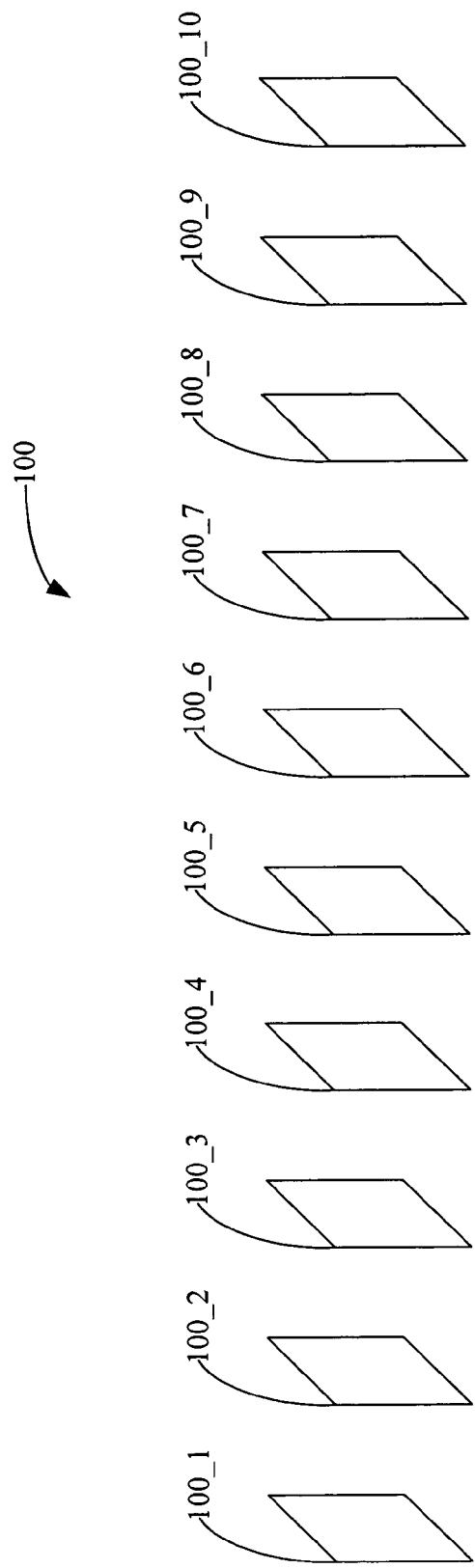
FIG. 1 is an illustration of an interlaced digital video stream.
Figure 2:
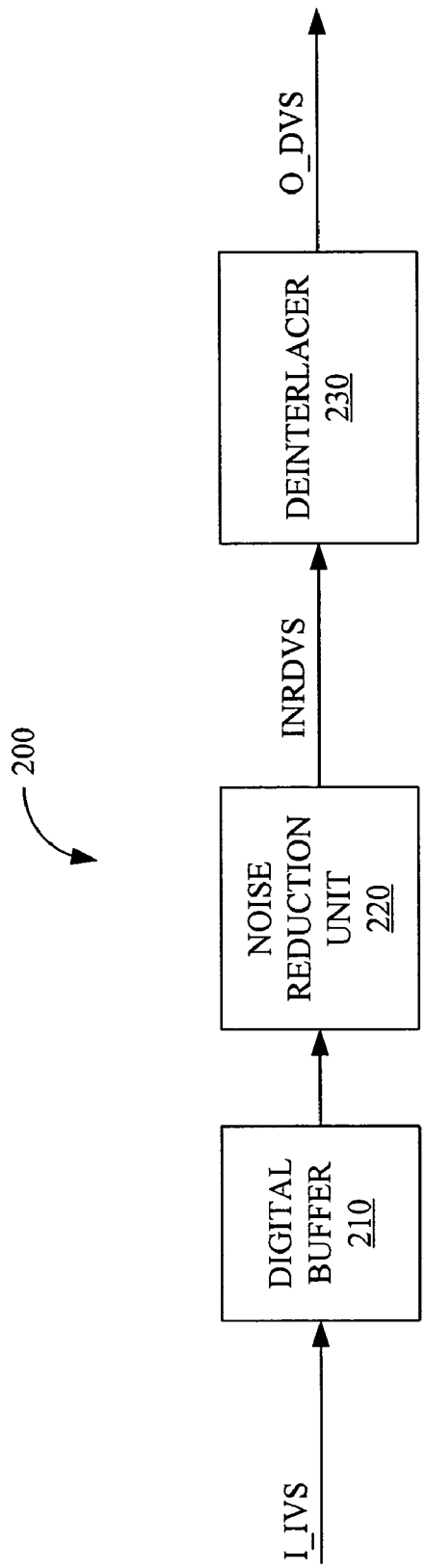
FIG. 2 is a simplified block diagram of a conventional noise reduction system.
Figure 3:
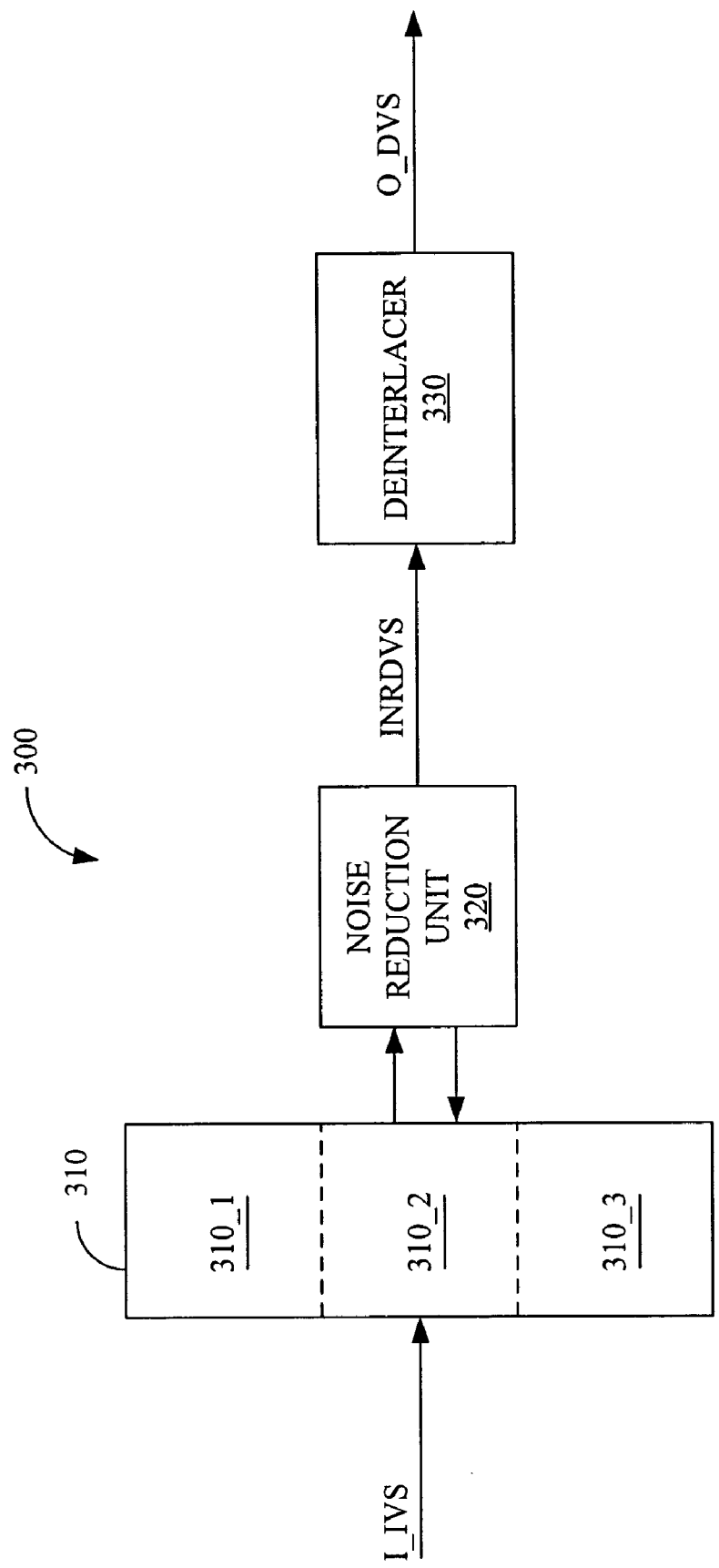
FIG. 3 is a block diagram of a noise reduction system in accordance with one embodiment of the present invention.

FIG. 3 is a simplified block diagram of a noise reduction system 300 having a digital buffer 310, a noise reduction unit 320 and a deinterlacer 330. In the embodiment of FIG. 3, digital buffer 310 has three field buffers 310_1, 310_2, and 310_3. Digital buffer 310 is used as a circular buffer so that the first field of input interlaced video stream I_IVS is written into field buffer 310_1, the second fields of input interlaced video stream I_IVS is written into field buffer 310_2, the third field of input interlaced video stream I_IVS is written into field buffer 310_3. Then the fourth field of input interlaced video stream I_IVS is written into field buffer 310_1, the fifth fields of input interlaced video stream I_IVS is written into field buffer 310_2, and the sixth field of input interlaced video stream I_IVS is written into field buffer 310_3. This process continues for all the fields of input interlaced video stream I_IVS.

Thus, in general digital buffer 310 contains three fields from input interlaced video stream I_IVS. Noise reduction unit 320 generally uses an early field pointer EFP to track which field buffer contains the earliest field and a late field pointer LFP to track which field buffer contains the latest field. Thus initially, early field pointer EFP would point to field buffer 310_1 and late field pointer LFP would point to field buffer 310_3. However as noise reduction unit 320 processes each field early field pointer EFP and late field pointer LFP would be incremented modulo 3 as explained in more detail below. For convenience, the field in the buffer pointed to by early field pointer EFP is called the "early field." Similarly, the field in the buffer pointed to by late field pointer LFP is called the "late field."

Unlike conventional noise reduction systems which simply perform averaging of multiple pixel data and do not re-use earlier noise reduced results in later process, the embodiment of FIG. 3 writes data back into digital buffer 310 to provide recursive noise reduction. Moreover, some noise reduction parameters are adaptively updated according to the evaluation of noise level. Specifically, noise reduction unit 320 retrieves pixels in the early field to process corresponding pixels in the late field and perform noise reduction on the corresponding pixels of the late field to form modified pixels as described in more detail below. The modified pixels are used to form interlaced noise reduced video stream INRDVS, which is provided to deinterlacer 330. In addition, the modified pixels are written back into the late field in digital buffer 310. Thus, for example, after modifying a field X, the modified field X is used to modify a field X+2.

Deinterlacer 330, combines corresponding fields into full frames to generate output deinterlaced video stream O_DVS which can be displayed on a progressive digital video device (not shown).

Figure 4:
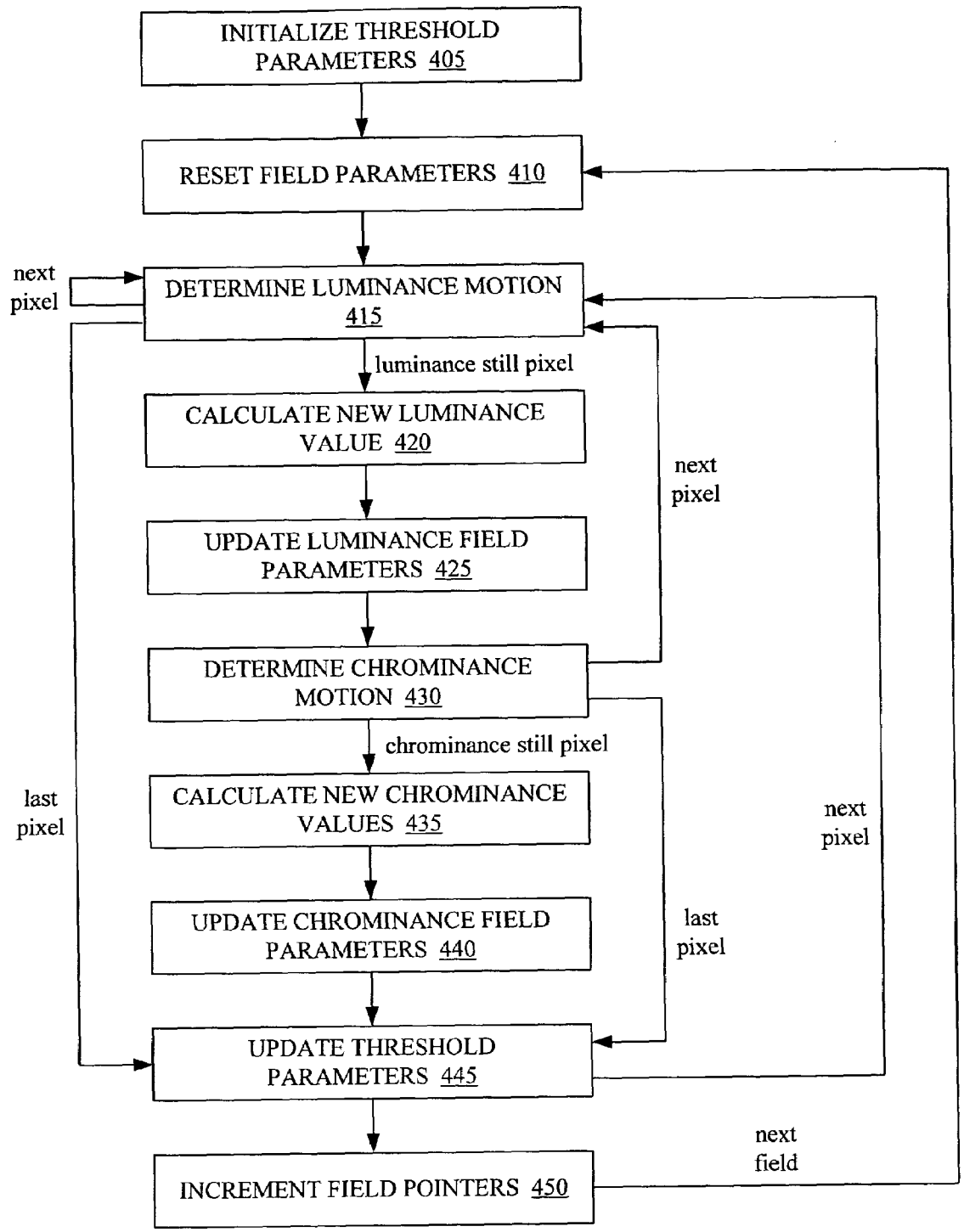
FIG. 4 is a flow diagram for noise reduction in accordance with one embodiment of the present invention.

FIG. 4 is a flow chart illustrating the function of noise reduction unit 320 (FIG. 3) in accordance with one embodiment of the present invention. The process illustrated by the flow chart of FIG. 4 includes many user definable parameters which influences the amount and quality of noise reduction provided by noise reduction unit 320. These parameters include a minimum luminance threshold parameter Y_T_MIN, a minimum chrominance threshold parameter C_T_MIN, a luminance noise reduction level parameter Y_NRL, a chrominance noise reduction level parameter C_NRL, a luminance threshold update parameter Y_TU, and a chrominance threshold update parameter C_TU. Furthermore, the process illustrated by the flow chart of FIG. 4 also includes many process parameters such as a luminance threshold parameter Y_T, a chrominance threshold parameter C_T, a luminance still pixel count parameter Y_CNT, a chrominance still pixel count parameter C_CNT, a luminance difference summation parameter Y_SUMM, a chrominance difference summation parameter C_SUMM, a luminance motion parameter Y_M, a U chrominance motion parameter U_M, and a V chrominance motion parameter V_M.

Luminance threshold parameter Y_T and chrominance threshold parameter C_T are used to determine if pixels are still, i.e. not moving, based on luminance and chrominance, respectively. Because, luminance threshold parameter Y_T and chrominance threshold parameter C_T are adaptively updated, the user defined parameters minimum luminance threshold parameter Y_T_MIN and minimum chrominance parameter C_T_MIN define lower bounds for luminance threshold parameter Y_T and chrominance threshold parameter C_T, respectively. Luminance threshold update parameter Y_TU and chrominance threshold update parameter C_TU are used to control the rate that luminance threshold parameter Y_T and chrominance threshold parameter C_T are respectively updated as explained below. Luminance noise reduction level parameter Y_NRL controls the level of noise reduction based on luminance. Luminance noise reduction level parameter Y_NRL ranges from 0 to 1, inclusive. A lower value for luminance noise reduction level parameter Y_NRL provides higher level of noise reduction but may cause obvious shadows for moving objects. Conversely, higher value of luminance noise reduction level parameter Y_NRL provides less noise reduction. A value of 1 would actually "turn off" noise reduction. Generally, values of 0.25 to 0.75 provide acceptable results. Chrominance noise reduction level parameter C_NRL is the corresponding parameter for both chrominance parameters U and V. Luminance motion parameter Y_M gives an indication of the movement in terms of luminance of a pixel between the early field and the late field. Similarly, U chrominance motion parameter U_M and V chrominance motion parameter V_M, give an indication of the movement in terms of chrominance values of a pixel between the early field and the late field.

Table 1 provides the ranges and default values for the various user defined parameters for a specific embodiment of the present invention.

TABLE 1

| PARAMETER | RANGE   | DEFAULT VALUE |
|-----------|---------|---------------|
| Y_T_MIN   | [0, 255]| 10            |
| C_T_MIN   | [0, 255]| 30            |
| Y_TU      | [1, 3]  | 2             |
| C_TU      | [1, 3]  | 3             |
| Y_NRL     | [0, 1]  | 0.5           |
| C_NRL     | [0, 1]  | 0.5           |

The method illustrated by the flow chart of FIG. 4 begins by initializing luminance threshold parameter Y_T and chrominance threshold parameter C_T to be equal to minimum luminance threshold parameter Y_T_MIN and minimum chrominance parameter C_T_MIN, respectively in initialize threshold parameters step 405.

Noise reduction unit 320 then begins to process the fields in digital buffer 310. Each pixel in the late field is processed sequentially. For clarity, the method is described below using the term "late current pixel" to represent the pixel being processed in the late field and the term "early current pixel" to represent the corresponding pixel in the early field having the same relative location as the late current pixel. Each pixel in the late field will be the late current pixel at some point. At the start of each field the field parameters are reset in reset field parameters step 410. Specifically, luminance still pixel count parameter Y_CNT and chrominance still pixel count parameter C_CNT are set equal to 1. The value 1 is chosen instead of zero to avoid possible division by zero errors that may occur in the case of completely different fields in terms of luminance and/or chrominance, i.e. every "late current pixel" in the late field is determined as non-still pixel in terms of luminance and/or chrominance. Luminance difference summation parameter Y_SUMM and chrominance difference summation parameter C_SUMM are set equal to 0.

In determine luminance motion step 415, noise reduction unit 320 calculates the luminance motion parameter Y_M, which is equal to the luminance value of the late current pixel in the late field minus the luminance value of the early current pixel in the early field. Furthermore, noise reduction unit 320 determines whether the late current pixel is a "luminance still pixel." In one embodiment of the present invention the late current pixel is classified as a "luminance still pixel" if the absolute value of luminance motion parameter Y_M is less than luminance threshold parameter Y_T. Another method to determine whether the late current pixel is a luminance still pixel is described below with respect to FIG. 5. If the late current pixel is not a luminance still pixel and the late current pixel is not the last pixel in the field, then the next pixel in the field is selected as the late current pixel and noise reduction unit 320 performs determine luminance motion step 415 again. If the late current pixel is not a luminance still pixel and the late current pixel is the last pixel in the field, processing proceeds to update threshold parameters step 445 (described below). If the late current pixel is a luminance still pixel then processing proceeds to calculate new luminance value step 420.

In calculate new luminance value step 420, the luminance value of the late current pixel is recomputed to be equal to the luminance value of the early current pixel plus luminance noise reduction level parameter Y_NRL multiplied by luminance motion parameter Y_M. Then, the luminance field parameters are updated in update luminance field parameters step 425. Specifically, luminance still pixel count parameter Y_CNT is incremented by one and a luminance difference summation parameter Y_SUMM is incremented by luminance motion parameter Y_M squared.

In determine chrominance motion step 430, noise reduction unit 320 calculates U chrominance motion parameter U_M, which is equal to the U chrominance value of the late current pixel in the late field minus the U chrominance value of the early current pixel in the early field. In addition, noise reduction unit 320 calculates V chrominance motion parameter V_M, which is equal to the V chrominance value of the late current pixel in the late field minus the V chrominance value of the early current pixel in the early field. Furthermore, noise reduction unit 320 determines whether the late current pixel is a "chrominance still pixel." In one embodiment of the present invention the late current pixel is classified as a "chrominance still pixel" if the absolute value of U chrominance motion parameter U_M is less than chrominance threshold parameter C_T and the absolute value of V chrominance motion parameter V_M is less than chrominance threshold parameter C_T. The method to determine whether the late current pixel is a luminance still pixel as described below with respect to FIG. 5 can also be used to determine whether the late current pixel is a chrominance still pixel. If the late current pixel is not a chrominance still pixel and the late current pixel is not the last pixel in the field, then the next pixel in the field is selected as the late current pixel and noise reduction unit 320 performs determine luminance motion step 415 again. If the late current pixel is not a chrominance still pixel and the late current pixel is the last pixel in the field, processing proceeds to update threshold parameters step 445 (described below). If the late current pixel is a chrominance still pixel then processing proceeds to calculate new chrominance value step 435.

In calculate new chrominance values step 435, the U chrominance value of the late current pixel is recomputed to be equal to the U chrominance value of the early current pixel plus chrominance noise reduction level parameter C_NRL multiplied by U chrominance motion parameter U_M. Similarly, the V chrominance value of the late current pixel is recomputed to be equal to the V chrominance value of the early current pixel plus chrominance noise reduction level parameter C_NRL multiplied by V chrominance motion parameter V_M. Then, the chrominance field parameters are updated in update chrominance field parameters step 440. Specifically, chrominance still pixel count parameter C_CNT is incremented by two and a chrominance difference summation parameter C_SUMM is incremented by U chrominance motion parameter U_M squared and V chrominance motion parameter V_M squared.

Then, noise reduction unit 320 adaptively updates the threshold values in update threshold parameters step 445. Specifically, luminance threshold parameter Y_T is set equal to the greater of minimum luminance threshold parameter Y_T_MIN or luminance threshold update parameter Y_TU multiplied by the square root of half of luminance difference summation parameter Y_SUMM divided by luminance pixel count parameter Y_CNT, i.e., Y_T=max(Y_T_MIN, (Y_TU*sqrt(0.5*Y_SUMM/Y_CNT))). Similarly, chrominance threshold parameter C_T is set equal to the greater of minimum chrominance threshold parameter C_T_MIN or chrominance threshold update parameter C_TU multiplied by the square root of half of chrominance difference summation parameter C_SUMM divided by chrominance pixel count parameter C_CNT, i.e., C_T=max(C_T_MIN, (C_TU*sqrt(0.5*C_SUMM/C_CNT))). If the late current pixel is not the last pixel in the field, then the next pixel in the field is selected as the late current pixel and noise reduction unit 320 performs determine luminance motion step 415 again. Otherwise, the field pointers are incremented in increment field pointers step 450. Specifically, if early field pointer EFP is pointing to field buffer 310_X, early field pointer EFP is set to point to field buffer 310_((X+1) MOD 3). Similarly, if late field pointer LFP is pointing to field buffer 310_Y, late field pointer LFP is set to point to field buffer 310_((Y+1) MOD 3). Processing of the next field begins in reset field parameters step 410.

Figure 5:
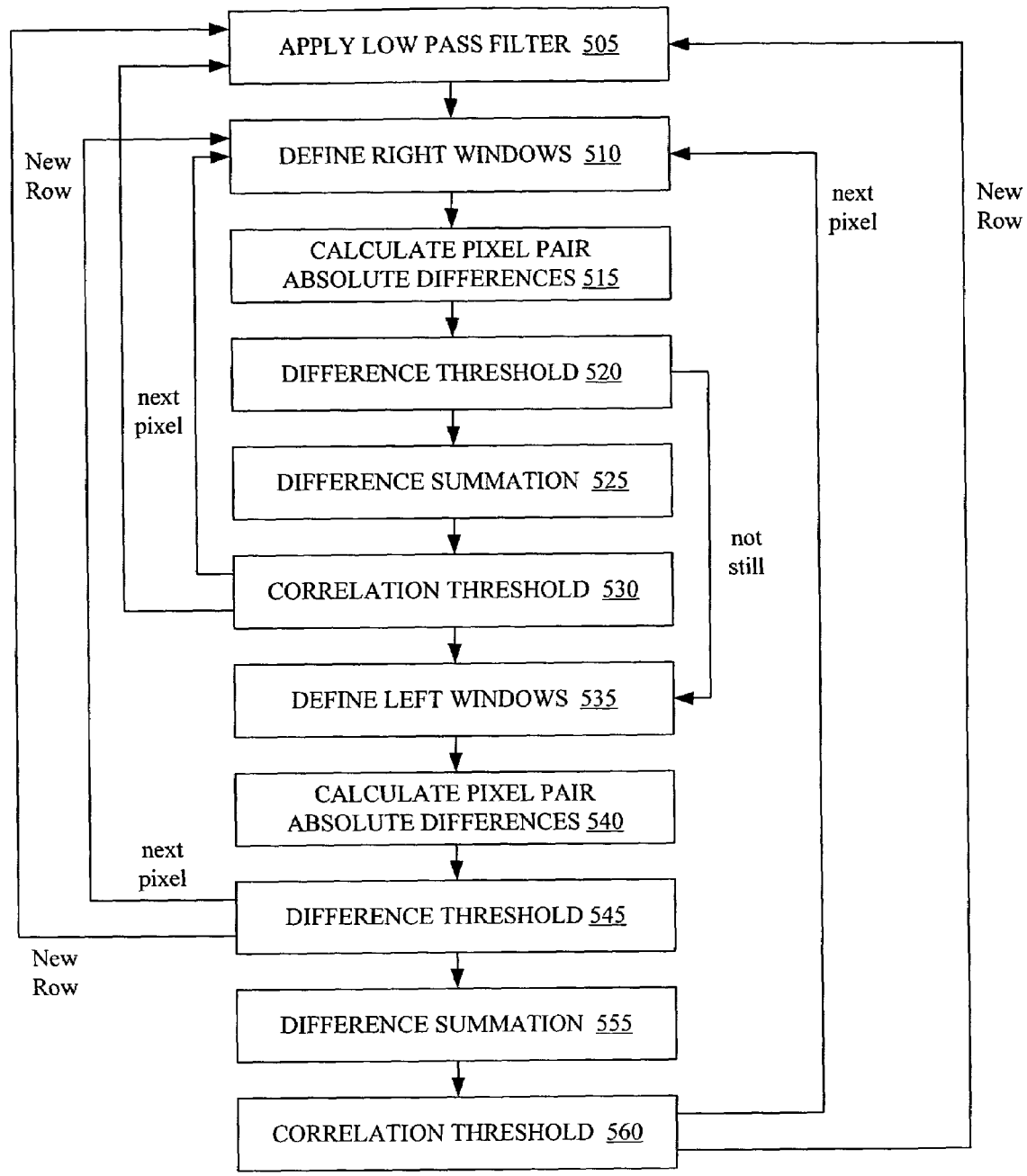
FIG. 5 is a flow diagram for still pixel detection in accordance with one embodiment of the present invention.

FIG. 5 is a flow diagram for determining whether the late current pixel is a luminance still pixel. In general, the method of FIG. 5 tests the late current pixel using both a right window still pixel test and a left window still pixel test (described in detail below). If the late current pixel passes the either the right window still pixel test or the left window still pixel test as described below, then the late current pixel is considered a "luminance still pixel". In the embodiment of FIG. 5, an optional low pass filter can be applied in apply low pass filter step 505. Generally, the low pass filter can be enabled or disabled by a user. Furthermore, the user can determine the order of the low pass filter. For example, in one embodiment of the present invention, a fifth order low pass filter is used with a cut frequency between 4.5 Mhz and 6 Mhz, inclusive. In general, pixels modified by the low pass filter are only used during still pixel detection. The unmodified values are used to calculate values for luminance and chrominance during noise reduction. If the low pass filter is enabled, the low pass filter can be applied to the entire row or to each window independently.

A late right filter window for the late current pixel and an early right filter window for the early current pixel are defined in define right filter windows 510. The late right filter window of size N for the late current pixel would include the late current pixel and the next N-1 pixels to the right of the late current pixel in the late field. Similarly, the early right filter window for the early current pixel would include the early current pixel and the next N-1 pixels to the right of the early current pixel in the early field. Then, for each pixel in the late right filter window, the absolute value of the difference between the luminance of the pixel in the late right filter window and the luminance of the corresponding pixel in the early right filter window is calculated in calculate pixel pair absolute differences step 515. In difference threshold step 520, the absolute value of the difference of luminance values for each pair of pixels is compared to a difference threshold DT, which is user configurable. If the absolute value of the difference of luminance value for any pair is greater than difference threshold then the late current pixel is not considered a luminance still pixel using the right window test; therefore, processing is passed to define left filter window step 535 to perform the left window tests. However, if every absolute value of the differences in luminance value for each pair of pixels is less than or equal to difference threshold DT, then processing continues in difference summation step 525. In one embodiment of the present invention, difference threshold DT has a default value of 40 in a range from 0 to 255 inclusive. In some embodiments of the present invention difference threshold step 520 is omitted. Alternatively, difference threshold DT can be set to a maximum value (such as 255) to disable difference threshold step 520.

In difference summation step 525, a correlation sum C_SUM, which is initialized at zero, is generated from the absolute values of differences of luminance value for each pixel. Specifically, for each pair of pixels, the absolute value of the difference in luminance values is compared to a summation threshold ST. If the absolute value of the difference is greater than summation threshold ST, the absolute value of the difference in luminance value is added to correlation sum C_SUM. Otherwise, correlation sum C_SUM is not increased. Some embodiments of the present invention do not use summation threshold ST. In these embodiments, the absolute value of differences for every pixel in the right window is added to correlation sum C_SUM. Alternatively, summation threshold ST could be set to be zero to achieve the same effect.

Then, correlation sum C_SUM is divided by the size of the late right window and compared to a correlation threshold CT in correlation threshold step 530. If correlation sum C_SUM divided by the size of the late right window is less than or equal to correlation threshold CT, then the late current pixel is classified as a luminance still pixel. Otherwise the late current pixel must be further processed beginning in define left windows step 535. When the method of FIG. 5 is used with noise reduction unit 320 in the method of FIG. 4, correlation threshold CT is equivalent to luminance threshold parameter Y_T for luminance still pixel detection. As described above, luminance threshold parameter Y_T is adaptively adjusted during noise reduction. Thus, correlation threshold CT is also adaptively adjusted when used by noise reduction unit 320.

If the late current pixel is classified as a luminance still pixel in correlation threshold step 530 and the late current pixel is the last pixel of a line then processing is passed to apply low pass filter step 505 and the next pixel (i.e. the first pixel of the next line) becomes the late current pixel. If the late current pixel is classified as a luminance still pixel in correlation threshold step 530 and the late current pixel is not the last pixel of a line then processing is passed to define right windows step 510 and the next pixel becomes the late current pixel. In one embodiment of the present invention, summation threshold ST and correlation threshold CT are user configurable in the range of 0 to 255 inclusive, but have default values of 5 and 15, respectively.

In define left windows step 535, a late left filter window for the late current pixel and an early left filter window for the early current pixel are defined. The late left filter window of size N for the late current pixel would include the late current pixel and the next N-1 pixels to the left of the late current pixel in the late field. Similarly, the early left filter window of size N for the early current pixel would include the early current pixel and the next N-1 pixels to the left of the early current pixel in the early field. Then, for each pixel in the late left filter window, the absolute value of the difference between the luminance of the pixel in the late left pixel window and the luminance of the corresponding pixel in the early left pixel window is calculated in calculate pixel pair absolute differences step 540. In difference threshold step 545, the absolute value of the difference of luminance values for each pair of pixels is compared to a difference threshold DT, which is user configurable. If the absolute value of the difference of luminance value for any pair is greater than difference threshold then the late current pixel is not considered a luminance still pixel using the left window test. In some embodiments of the present invention difference threshold step 545 is omitted. Alternatively, difference threshold DT can be set to a maximum value (such as 255) to disable difference threshold step 545.

Because the late current pixel has already failed the right window tests, the late current pixel is classified as a luminance non-still pixel. Processing on the next pixel is then passed to apply low pass filter step 505 if the late current pixel was the last pixel of a row. Otherwise processing on the next pixel is passed to define right windows step 510. However, if every absolute value of the differences in luminance value for each pair of pixels is less than or equal to difference threshold DT, then processing continues in difference summation step 555.

In difference summation step 555, a correlation sum C_SUM, which is initialized at zero, is generated from the absolute values of differences of luminance value for each pixel. Specifically, for each pair of pixels, the absolute value of the difference in luminance values is compared to a summation threshold ST. If the absolute value of the difference is greater than summation threshold ST, the absolute value of the difference in luminance value is added to correlation sum C_SUM. Otherwise, correlation sum C_SUM is not increased. Some embodiments of the present invention do not use summation threshold ST. In these embodiments, the absolute value of differences for every pixel in the left window is added to correlation sum C_SUM. Alternatively, summation threshold ST could be set to be zero to achieve the same effect.

Correlation sum C_SUM is divided by the size of the late left window and compared to a correlation threshold CT in correlation threshold step 560. If correlation sum C_SUM divided by the size of the late left window is less then or equal to correlation threshold CT, then the late current pixel is classified as a luminance still pixel. Otherwise the late current pixel is classified as a luminance non-still pixel. If the late current pixel is the last pixel of a line then processing is passed to apply low pass filter step 505 and the next pixel (i.e. the first pixel of the next line) becomes the late current pixel. If the late current pixel is not the last pixel of a line then processing is passed to define right windows step 510 and the next pixel becomes the late current pixel. If the late current pixel is the last pixel of the field then processing can begin again with the first pixel of a next set of fields. In one embodiment of the present invention, summation threshold ST and correlation threshold CT are user configurable in the range of 0 to 255 inclusive, but have default values of 5 and 15, respectively.

Although, FIG. 5 is described with respect to luminance values to determine luminance still pixels. The method illustrated by FIG. 5 can also be applied to determine whether the late current pixel is a chrominance still pixel. Specifically, classification of chrominance still pixels can be determined by simply using chrominance values in place of luminance values. In one embodiment of the present invention, when the method illustrated in FIG. 5 is used for chrominance still pixel detection, default values for summation threshold ST and difference threshold DT are 10 and 70, respectively. When the method of FIG. 5 is used with noise reduction unit 320 in the method of FIG. 4 for chrominance still pixel detection, correlation threshold CT is equivalent to chrominance threshold parameter C_T for chrominance still pixel detection. As described above, chrominance threshold parameter C_T is adaptively adjusted during noise reduction. Thus, correlation threshold CT is also adaptively adjusted when used by noise reduction unit 320. However, in some embodiments of the present invention, both the U chrominance and the V chrominance values must meet the still pixel criterions.

In the various embodiments of the present invention, novel structures have been described for noise filtering systems. By using a recursive scheme with a novel method for classifying still pixels higher picture quality can be achieved. The various embodiments of the structures and methods of this invention that are described above are illustrative only of the principles of this invention and are not intended to limit the scope of the invention to the particular embodiments described. For example, in view of this disclosure those skilled in the art can define other still pixel tests, pixel pair differences, windows, thresholds, and so forth, and use these alternative features to create a method, circuit, or system according to the principles of this invention. Thus, the invention is limited only by the following claims.

What is claimed is:

1. A method for performing noise reduction on a video stream having a plurality of fields, the method comprising:
storing a first field having a plurality of pixels in a first field buffer;
storing a second field having a plurality of pixels in a second field buffer;
modifying a subset of pixels of the second field using information from the first field;
storing the subset of the pixels of the second field in the second buffer;
storing a third field having a plurality of pixels in the first field buffer;
modifying a subset of pixels of the third field using information from the second field; and
storing the subset of pixels of the third field in the first buffer.

2. The method of claim 1, further comprising:
storing a fourth field having a plurality of pixels in the second field buffer;
modifying a subset of pixels of the fourth field using information from the third field; and
storing the subset of pixels of the fourth field in the second buffer.

3. The method of claim 1, wherein the modifying a subset of pixels of the second field using information from the first field comprises:
selecting the subset of pixels using still pixel detection; and
modifying each pixel of the subset of pixels using a corresponding pixel of the first field.

4. The method of claim 3, wherein the selecting the subset of pixels using still pixel detection further comprises:
determining whether each pixel of the second field is a still pixel; and
adaptively updating a still pixel threshold parameter.

5. The method of claim 1, wherein the modifying a subset of pixels of the second field using information from the first field further comprises:
determining whether each pixel of the second field is a luminance still pixel; and
modifying a luminance value of a pixel in the second field when the pixel is a luminance still pixel.

6. The method of claim 5, wherein the determining whether each pixel of the second field is a luminance still pixel comprises:
calculating a luminance motion parameter for each pixel;
classifying a pixel as a luminance still pixel when an absolute value of the luminance motion parameter of the pixel is less than or equal to a luminance threshold.

7. The method of claim 6, further comprising adaptively updating the luminance threshold.

8. The method of claim 5, wherein the determining whether each pixel of the second field is a luminance still pixel comprises:
defining a first window containing a first plurality of pixels of the second field, wherein the first plurality of pixels includes a current pixel;
performing a first window still pixel test using the pixels of the first window.

9. The method of claim 8, wherein performing a first window still pixel test using the pixels of the first window comprises:
calculating a pixel pair difference for each pixel in the first window to generate a plurality of pixel pair differences; and
comparing an absolute value of each pixel pair difference with a difference threshold, wherein the current pixel fails the first window still pixel test when the absolute value of any pixel pair difference of the first window is greater than the difference threshold.

10. The method of claim 9, wherein performing a first window still pixel test using the pixels of the first window comprises:
 summing the absolute value of each pixel pair difference that is greater than a summation threshold to create a correlation sum of the first window;
 comparing the correlation sum of the first window with a correlation threshold, wherein the current pixel passes the first still pixel test when the correlation sum divided by a size of the first window is less than or equal to the correlation threshold.

11. The method of claim 10, further comprising adaptively updating the correlation threshold.

12. The method of claim 8, wherein the determining whether each pixel of the second field is a luminance still pixel, further comprises:
 defining a second window containing a second plurality of pixels of the second field, wherein the second plurality of pixels includes the current pixel;
 performing a second window still pixel test using the pixels of the second window.

13. The method of claim 12, wherein a pixel is a luminance still pixel when the pixel passes the first window still pixel test or the second window still pixel test.

14. The method of claim 5, wherein the modifying the luminance value of a pixel in the second field when the pixel is a luminance still pixel, comprises setting the luminance value of the pixel in the second field to be equal to a luminance value of a corresponding pixel in the first field plus a luminance noise reduction level parameter multiplied by a luminance motion parameter.

15. The method of claim 14, wherein the luminance motion parameter is equal to a luminance value of a current pixel in the second field minus the luminance value of a corresponding pixel in the first field.

16. The method of claim 5, wherein the modifying a subset of pixels of the second field using information from the first field further comprises:
 incrementing a luminance still pixel counter parameter by 1 when a pixel is classified as a luminance still pixel;
 increasing a luminance difference summation parameter by a square of the luminance motion parameter when a pixel is classified as a luminance still pixel.

17. The method of claim 16, wherein the modifying a subset of pixels of the second field using information from the first field further comprises:
 determining whether each pixel of the second field is a chrominance still pixel; and
 modifying a first chrominance value of a pixel in the second field when the pixel is a chrominance still pixel.

18. The method of claim 17, wherein the modifying a subset of pixels of the second field using information from the first field further comprises modifying a second chrominance value of a pixel in the second field when the pixel is a chrominance still pixel.

19. A system for performing noise reduction on a video stream having a plurality of fields, the system comprising:
 means for storing a first field having a plurality of pixels in a first field buffer;
 means for storing a second field having a plurality of pixels in a second field buffer;
 means for modifying a subset of pixels of the second field using information from the first field;
 means for storing the subset of the pixels of the second field in the second buffer;
 means for storing a third field having a plurality of pixels in the first field buffer;
 means for modifying a subset of pixels of the third field using information from the second field; and
 means for storing the subset of pixels of the third field in the first buffer.

20. The system of claim 19, further comprising:
 means for storing a fourth field having a plurality of pixels in the second field buffer;
 means for modifying a subset of pixels of the fourth field using information from the third field; and
 means for storing the subset of pixels of the fourth field in the second buffer.

21. The system of claim 19, wherein the means for modifying a subset of pixels of the second field using information from the first field comprises:
 means for selecting the subset of pixels using still pixel detection; and
 means for modifying each pixel of the subset of pixels using a corresponding pixel of the first field.

22. The system of claim 21, wherein the means for selecting the subset of pixels using still pixel detection further comprises:
 means for determining whether each pixel of the second field is a still pixel; and
 means for adaptively updating a still pixel threshold parameter.

23. The system of claim 19, wherein the means for modifying a subset of pixels of the second field using information from the first field further comprises:
 means for determining whether each pixel of the second field is a luminance still pixel; and
 means for modifying a luminance value of a pixel in the second field when the pixel is a luminance still pixel.

24. The system of claim 23, wherein the means for determining whether each pixel of the second field is a luminance still pixel comprises:
 means for calculating a luminance motion parameter for each pixel;
 means for classifying a pixel as a luminance still pixel when an absolute value of the luminance motion parameter of the pixel is less than or equal to a luminance threshold.

25. The system of claim 24, further comprising means for adaptively updating the luminance threshold.

26. The system of claim 24, wherein means for the determining whether each pixel of the second field is a luminance still pixel comprises:
 means for defining a first window containing a first plurality of pixels of the second field, wherein the first plurality of pixels includes a current pixel;
 means for performing a first window still pixel test using the pixels of the first window.

27. The system of claim 26, wherein the means for performing a first window still pixel test using the pixels of the first window comprises:
 means for calculating a pixel pair difference for each pixel in the first window to generate a plurality of pixel pair differences; and
 means for comparing an absolute value of each pixel pair difference with a difference threshold, wherein the current pixel fails the first window still pixel test when the absolute value of any pixel pair difference of the first window is greater than the difference threshold.

* * * * *